(12) United States Patent
Steele

(10) Patent No.: US 10,200,375 B2
(45) Date of Patent: Feb. 5, 2019

(54) DYNAMIC DENIAL OF SERVICE DETECTION AND AUTOMATED SAFE MITIGATION

(71) Applicant: Sony Interactive Entertainment America LLC, San Mateo, CA (US)

(72) Inventor: Benjamin James Steele, Aldgate (AU)

(73) Assignee: Sony Interactive Entertainment America LLC, San Mateo, CA (US)

(*) Notice: Subject to any disclaimer, the term of this patent is extended or adjusted under 35 U.S.C. 154(b) by 131 days.

(21) Appl. No.: 15/070,999

(22) Filed: Mar. 15, 2016

(65) Prior Publication Data

US 2017/0272465 A1    Sep. 21, 2017

(51) Int. Cl.
G06F 7/04 (2006.01)
H04L 29/06 (2006.01)
G06F 15/16 (2006.01)

(52) U.S. Cl.
CPC .......... H04L 63/101 (2013.01); H04L 63/107 (2013.01); H04L 63/1458 (2013.01); H04L 63/1466 (2013.01)

(58) Field of Classification Search
CPC ............. H04L 63/1458; H04L 61/2007; H04L 63/101; H04L 63/1483
USPC ..... 370/389, 392, 412; 709/206; 726/12, 30, 726/4
See application file for complete search history.

(56) References Cited

U.S. PATENT DOCUMENTS

| | | | | |
|---|---|---|---|---|
| 7,536,552 B2* | 5/2009 | Touitou | ................... | H04L 63/08 713/150 |
| 7,606,214 B1* | 10/2009 | Chandra Sekhar | ..... | H04L 51/28 370/351 |
| 7,760,722 B1* | 7/2010 | Tripathi | .............. | H04L 63/1458 370/389 |
| 2008/0082658 A1* | 4/2008 | Hsu | ......................... | H04L 51/12 709/224 |
| 2009/0059935 A1* | 3/2009 | Dec | ....................... | H04L 12/185 370/401 |
| 2010/0309819 A1* | 12/2010 | Sanchez | .............. | H04L 41/0806 370/255 |
| 2011/0165860 A1* | 7/2011 | Cai | ..................... | H04L 63/1475 455/411 |
| 2013/0124717 A1* | 5/2013 | Stevens | .................. | H04L 61/20 709/224 |

(Continued)

*Primary Examiner* — Gary S Gracia
(74) *Attorney, Agent, or Firm* — Martine Penilla Group, LLP

(57) ABSTRACT

Methods, systems, and computer programs are presented for automated detection and mitigation of Denial of Service (DoS) attacks. One method includes an operation for collecting traffic data from service network routers that provide users access to a service. The traffic data is applied to security rules to identify a blacklist of illegitimate users to be blocked. Further, the method receives from the one or more servers a whitelist with information regarding legitimate users and their geographical location. A safe blacklist is determined for each router based on the blacklist and the whitelist, and the respective safe blacklist is sent to each router. Legitimate users are not blocked from accessing the service, but an illegitimate user spoofing a legitimate user is blocked by the routers when trying to access the service from a geographic location that is not the geographic location of the legitimate user.

20 Claims, 10 Drawing Sheets

(56) References Cited

U.S. PATENT DOCUMENTS

| | | | |
|---|---|---|---|
| 2013/0152189 A1* | 6/2013 | Lee | H04L 63/1408 |
| | | | 726/13 |
| 2013/0179544 A1* | 7/2013 | Sainnsbury | H04L 67/34 |
| | | | 709/219 |
| 2014/0173731 A1* | 6/2014 | Mantripragada | H04L 12/66 |
| | | | 726/22 |

* cited by examiner

Security Rule Definition

Name — 502
Block High traffic from Russia

Description — 504
Detect source in Russia sending more than 25 Mb/s or 25K pps to internal IP address Rule logic — 506
Click to edit rule logic to detect traffic pattern Triggers — 508
[IP_packets_sec>25000] OR [IP_traffic_Mbs>25]

Actions — 510
[Log] AND [send_alert_controller47] AND [send_email Admin23]

Output parameters — 512
IP address under attack, packets_per_second, traffic_in_Mbs Schedule — 514
00:00-24:00 Everyday Time window — 516
1 Minute Severity — 518
☑ Critical
☐ Serious
☐ Moderate

DYNAMIC DENIAL OF SERVICE DETECTION AND AUTOMATED SAFE MITIGATION

BACKGROUND

1. Field of the Invention

The present embodiments relates to methods, systems, and programs for responding to Denial of Service (DoS) attacks.

2. Description of the Related Art

The growth in number and potential of cloud services has increased the number of options available to Internet users. For example, game streaming services provide access to a wide selection of online games, where the game is played on a server and then displayed on a terminal used by the player.

However, DoS attacks on the game streaming servers and network may render the service unavailable. Blocking attackers from accessing the servers may be a response to the attacks, but legitimate users may be blocked from accessing the servers too. Sometimes, illegitimate users spoof their attacks to appear as legitimate users, complicating the process of blocking the attackers.

What is needed is a solution to block illegitimate attacks while allowing legitimate users constant access to the service. It is in this context that embodiments arise.

SUMMARY

Methods, devices, systems, and computer programs are presented for automated detection and mitigation of Denial of Service (DoS) attacks. It should be appreciated that the present embodiments can be implemented in numerous ways, such as a method, an apparatus, a system, a device, or a computer program on a computer readable medium. Several embodiments are described below.

One general aspect includes a method that includes an operation for collecting traffic data from routers of a service network, the routers providing users access to a service delivered by one or more servers. The method also includes operations for applying the traffic data to a plurality of security rules to identify a blacklist of illegitimate users to be blocked from the service, and for receiving from the one or more servers a whitelist. The whitelist includes information regarding legitimate users and the geographical location of the legitimate users. The method further includes operations for determining a safe blacklist for each router based on the blacklist and the whitelist, and for sending the respective safe blacklist to each router. The legitimate users are not blocked from accessing the one or more servers, but an illegitimate user spoofing a legitimate user is blocked by the routers when the illegitimate user tries to access the one or more servers from a geographic location that is not the geographic location of the legitimate user being spoofed.

One general aspect includes a security controller including a memory for storing a security program, a network interface, and a processor for executing the security program. The processor collects traffic data from routers of a service network, the routers providing users access to a service delivered by one or more servers. The processor applies the traffic data to a plurality of security rules to identify a blacklist of illegitimate users to be blocked from the service, and the processor receives from the one or more servers, a whitelist that includes information regarding legitimate users and the geographical location of the legitimate users. The processor determines a safe blacklist for each router based on the blacklist and the whitelist, and the processor sends the respective safe blacklist to each router, where legitimate users are not blocked from accessing the one or more servers, where an illegitimate user spoofing a legitimate user is blocked by the routers when the illegitimate user tries to access the one or more servers from a geographic location that is not the geographic location of the legitimate user being spoofed.

Another general aspect includes a non-transitory computer-readable storage medium storing a computer program for a security controller, the computer-readable storage medium including program instructions for collecting traffic data from routers of a service network. The routers provide users access to a service delivered by one or more servers. The storage medium also includes program instructions for applying the traffic data to a plurality of security rules to identify a blacklist of illegitimate users to be blocked from the service, and program instructions for receiving from the one or more servers a whitelist, the whitelist including information regarding legitimate users and a geographical location of the legitimate users. The storage medium further includes program instructions for determining a safe blacklist for each router based on the blacklist and the whitelist, and program instructions for sending the respective safe blacklist to each router, where legitimate users are not blocked from accessing the one or more servers, where an illegitimate user spoofing a legitimate user is blocked by the routers when the illegitimate user tries to access the one or more servers from a geographic location that is not the geographic location of the legitimate user being spoofed.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

FIG. 5 is a user interface for managing security alerts, according to one embodiment.

DETAILED DESCRIPTION

Methods, systems, and computer programs are presented for automated detection and mitigation of Denial of Service (DoS) attacks. A DoS attack is an assault on network and/or computing resources intended to make the resources unavailable to the intended users. A Distributed Denial of Service (DDoS) attack takes place when the source of the attack comes from more than one computer, e.g., thousands of computers.

Two common forms of DoS attacks are attacks that aim at disabling resources (e.g., crashing a server) and attacks that flood the computer resources with requests, making the computer resources too busy to attend the requests of legitimate users. DDoS attacks tend to be harder to defend, and oftentimes involve forging the internet protocol (IP) address of the sender (e.g., IP address spoofing), so the location of the attacking machines cannot be easily identified and packet filtering based on the source IP address is ineffective.

Embodiments presented herein perform automatic attack detection and mitigation. The data from routers at the edge of the network is analyzed in real time and correlated to alert-generating security rules. The system also tracks the geographic locations of legitimate users accessing the network. When an attack is detected using a particular source IP address of a legitimate user, automated mitigation takes place by blocking access of illegitimate users using the IP address but entering the network in a location that is different from the location of the legitimate user. However, the access at the location where the legitimate user is accessing the network is not blocked in order to allow the legitimate user to continue using the service.

One method includes an operation for collecting traffic data from service network routers that provide users access to a service. The traffic data is applied to security rules to identify a blacklist of illegitimate users to be blocked. Further, the method receives from the one or more servers a whitelist with information regarding legitimate users and their geographical location. A safe blacklist is determined for each router based on the blacklist and the whitelist, and the respective safe blacklist is sent to each router. Legitimate users are not blocked from accessing the service, but an illegitimate user spoofing a legitimate user is blocked by the routers when trying to access the service from a geographic location that is not the geographic location of the legitimate user.

It will be apparent, that the present embodiments may be practiced without some or all of these specific details. In other instances, well-known process operations have not been described in detail in order not to unnecessarily obscure the present embodiments.

Figure 1:
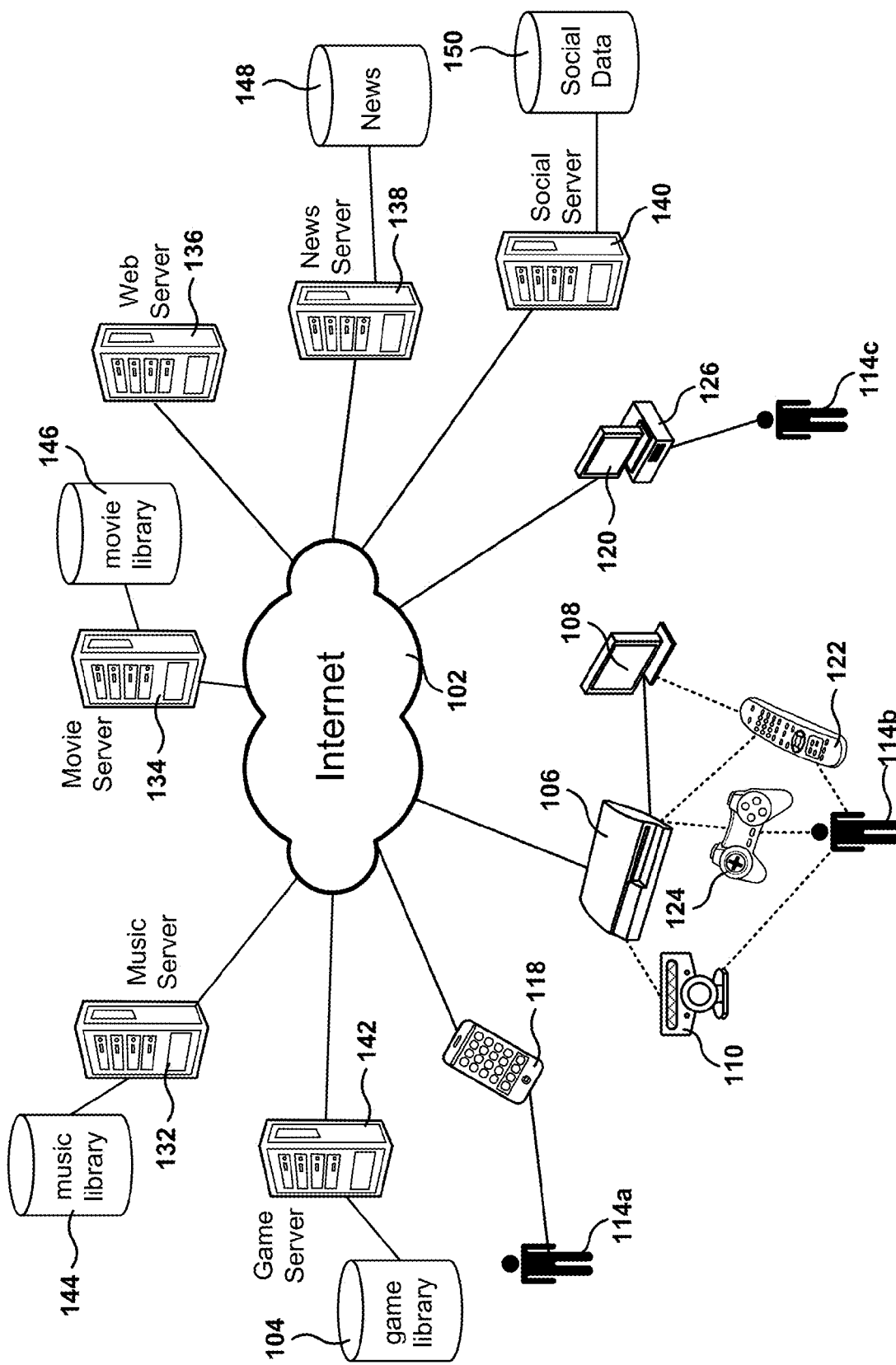
FIG. 1 shows a schematic diagram of a networked environment for accessing multimedia items, according to one embodiment.

FIG. 1 shows a schematic diagram of a networked environment for accessing multimedia items, according to one embodiment. There is a plurality of servers connected to Internet 102 that provide different types of multimedia-delivery services. A web server 136 provides multimedia-access web pages to users 114a-114c (e.g., using standard http (Hypertext Transfer Protocol) transfers or any other message exchange mechanism).

Users 114a-114c can access multimedia content through any device, such as mobile phone 118, game console 106, personal computer (126) with display 120, Personal Digital Assistants (PDA), laptops, workstations, tablets, television 108, etc. The users may enter input via mouse, or keyboard, a touch screen or a numeric keypad, camera 110 (to capture player movement and sound), controller 124, remote control 122, etc.

Game server 142 provides game access to users. The game server includes, or is connected to, a game library 104 with a plurality of games that may be accessed over the Internet 102. When a user requests a game, the game server 142 may send the game to the user's device, or the game server 142 may execute the game and provide an interface for accessing the game remotely.

Music server 132 delivers songs to the remote users, and music server 132 interfaces with a music library 144 that stores the available songs for downloading or streaming. Similarly, movie server 134 provides movie access to the remote users, and a movie library 146 stores the movies available for download or remote viewing. The news server 138 provides news 148 for the users.

Social server 140 manages a social network and provides the services associated with the social network. Social server 140 stores social data 150 that includes data associated with the social network, such as user profiles, friendship relationships between users, messages exchanged between users, friendship requests, etc.

It is noted that the embodiments illustrated in FIG. 1 are exemplary. Other embodiments may utilize different servers, distributed servers, or combine the functionality of several servers into a single server, additional servers (e.g., providing book services), etc. The embodiments illustrated in FIG. 1 should therefore not be interpreted to be exclusive or limiting, but rather exemplary or illustrative.

Figure 2:
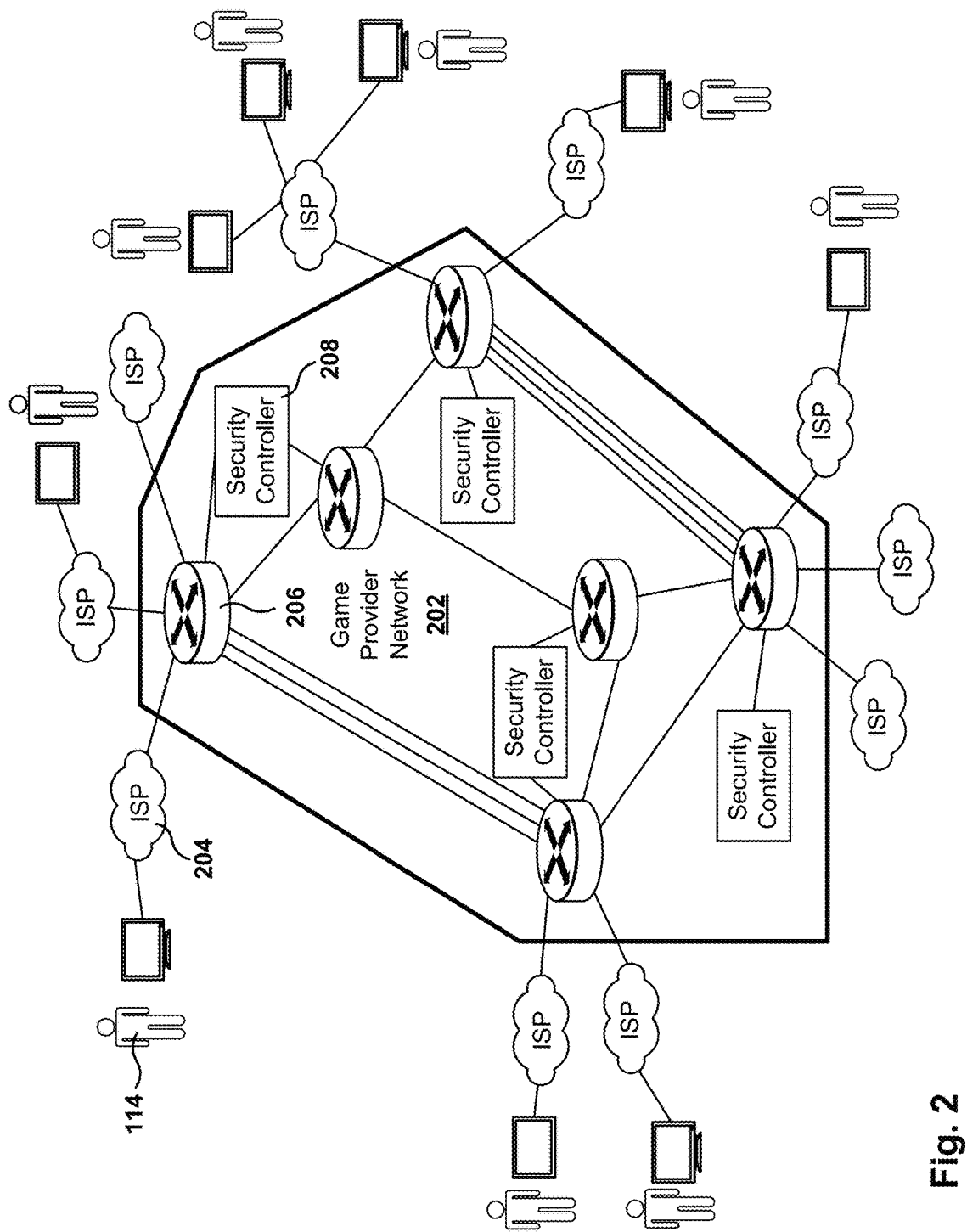
FIG. 2 shows a diagram of the game provider network, according to one embodiment.

FIG. 2 shows a diagram of the game provider network, according to one embodiment. In one embodiment, a service provider, such as a game provider, has a private game provider network 202 that is under the management and control of the game provider. The game provider network 202 includes a plurality of routers 206 with multiple interconnections among them, where some of the routers are at the edge of the network while other routers connect to other routers. The routers at the edge are typically connected to one or more Internet Service Providers (ISP) 204 and users 114 enter the game provider network through one of the ISP connections.

In one embodiment, the game provider network 202 includes one or more security controllers 208, which perform network related operations, such as detecting and responding to security threats, managing authentication codes, configuring routers on the game provider network, verifying rental entitlements, selecting the best game streaming server or cluster, etc. More details regarding security controllers are provided below with reference to FIG. 3. In one embodiment, the game provider network is distributed across several continents, being able to reach millions of users. The data centers for the gaming service may be distributed throughout the world.

Further, the game provider network includes its own data centers and other points of presence (POPs), which may be in rented space in the premises of other network providers. When a packet arrives at the game provider network 202, the packet becomes under the control of the game provider, because all the equipment within the game provider network 202 is under the control of the game provider. This means that the game provider is able to configure all the network equipment within the network to provide transport functions, as well as other security functions, as discussed in more detail below.

In the context of network security, a spoofing attack occurs when a person or program successfully masquerades as another by falsifying data, thereby gaining an illegitimate advantage. For example, a spoof attack occurs when the user sends an IP packet with the source IP address of another user, instead of with the source IP address of the attacker. When the packet reaches an ISP, some ISPs check that the source IP address is the IP address corresponding to the sender, and if it is not, the packet is dropped. But most often, ISPs do not check the source IP address for correctness, thereby allowing malicious users to spoof others by using somebody else's source IP address.

Sometimes, DDoS attacks are implemented by the use of botnets, which are interconnected computers communicating with other similar machines in an effort to complete repetitive tasks and objectives. Botnets sometimes compromise computers whose security defenses have been breached and control conceded to a third party. Each such compromised device, also known as a "bot," is created when a computer is penetrated by software from a malware (malicious software) distribution. However, it could also be someone that hacks into a computer. The controller of a botnet is able to direct the activities of these compromised computers through communication channels such as the Internet.

Security controllers 208 communicate with the routers utilizing data-exchange protocols, such as Internet Protocol Flow Information Export (IPFIX). The IPFIX standard defines how IP flow information is to be formatted and transferred from an exporter (e.g., source of the data, such as a router) to a collector (e.g., security controller 208). Another protocol for communicating traffic flow information is the proprietary protocol NetFlow from Cisco Systems®. The embodiments presented herein may be implemented with any protocol for sharing information between the routers and the security controllers.

For IPFIX, a flow includes a plurality of packets observed in a specific timeslot and sharing a number of defined properties, e.g. <source and destination IP address, source and destination ports, transmission protocol, source interface, and DSCP or ToS value>.

When a packet comes into the router, the router examines the packet and tracks some of the information, such as where the packet came from, destination, type of services, etc. The router extracts metadata from the packet, and the metadata is stored in the router. This metadata is periodically purged, such as every 10 seconds, but other values are also possible.

In one embodiment, the geographic location of the packet is identified by examining the packet's IP address and the port in which the packet arrived to the router. The port identifies the ISP connected to the edge router. The geographic location may be determined as an address, a metropolitan area, a region, a country, or a continent. For example, if a packet comes in through an ISP in Great Britain to a router located in London, it is possible to determine that the sender is most likely in Great Britain, and that the sender is not located in California.

Embodiments are presented with reference to a game provider network, but the security solutions presented herein may be applied to any type of network and any type of service.

Figure 3:
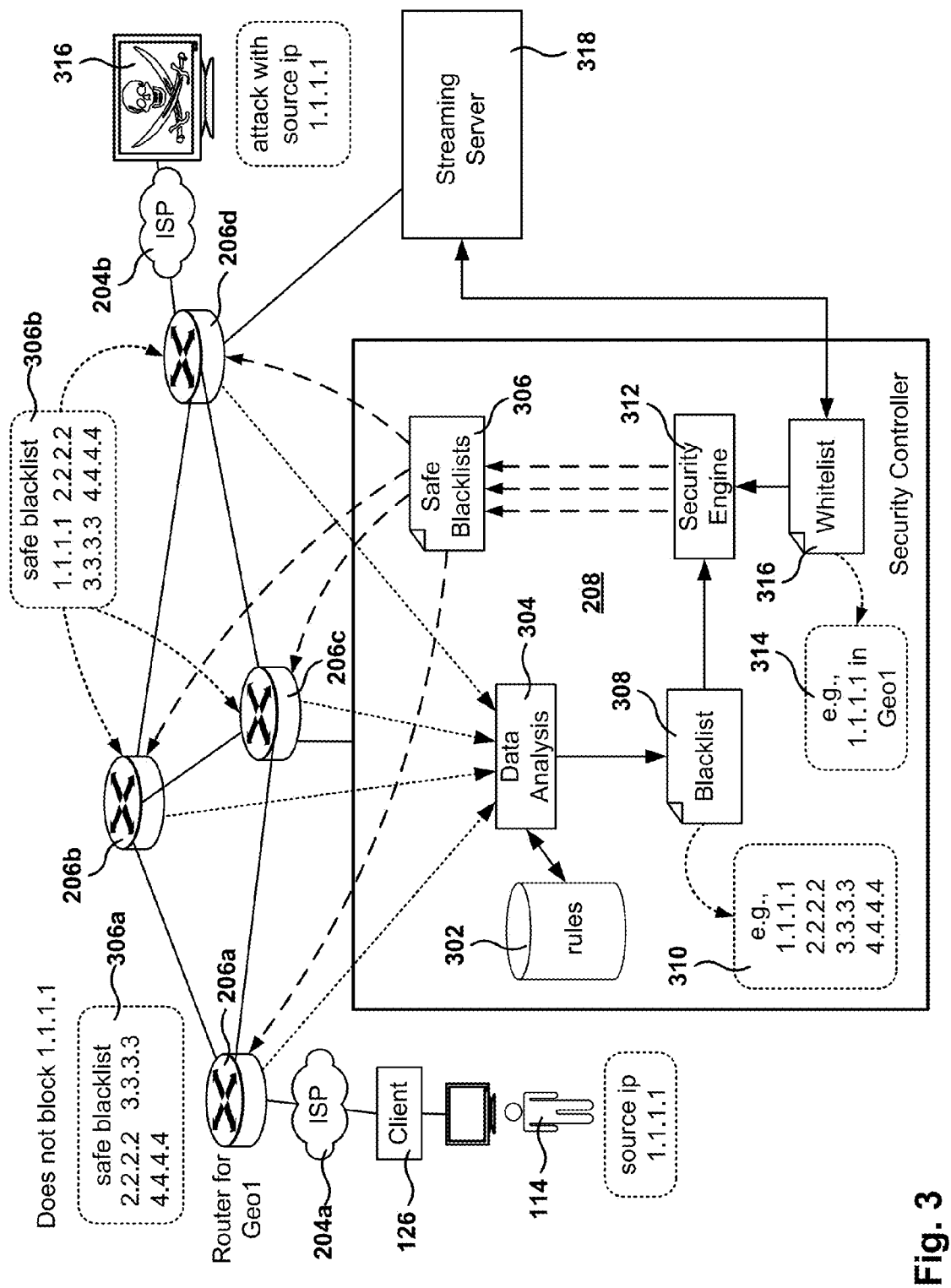
FIG. 3 illustrates the automatic detection and mitigation of dynamic denial of service attacks, according to one embodiment.

FIG. 3 illustrates the automatic detection and mitigation of dynamic denial of service attacks, according to one embodiment. In the exemplary embodiment of FIG. 3, a security controller 208 is in communication with four edge routers 206a-206d. Each of the routers is at a different geographical location, and router 206a is at a first geographic location designated as Geo1.

A user 114 is accessing the network utilizing client 126 connected to ISP 204a, which is connected to router 206a. Therefore, user 114 accesses the game network through router 206a. In this example, the client device 126 has a source IP address of 1.1.1.1.

Security controller 208 includes a data analysis module 304, security rules database 302, and security engine 312.

Data analysis module 304 collects traffic data from the routers in the private network. A plurality of security rules 302 have been defined to generate security alerts based on the collected traffic data. More details regarding rules are provided below with reference to FIG. 5.

Once the traffic data is correlated with the security rules, a blacklist 308 is generated identifying attackers. In one embodiment, the blacklist includes one or more source IP addresses to be blocked by the routers. For example, a security rule may identify a security threat when Transmission Control Protocol (TCP) packets are coming from China at a rate of more than 10 packets a second from the same IP address. The telemetry indicates one or more of the edge router, the geographic location, the destination address, the spoof IP address, timestamp, a size of the packet, number of packets of the flow, etc. in another embodiment, the blacklist includes a source IP address and the port identified in the packet.

If the telemetry obtained from the routers indicates that the security rule condition has taken place, then an alert is created, where the alert includes adding the source IP address to the blacklist 308, as well as some other mitigating or logging actions to notify the network administrator.

The routers periodically send traffic data to one or more security controllers, which then analyze the data for security threats. The detection of threats is performed in almost-real time (e.g., a ten-second delay, but other values are also possible). The goal is that if a packet, or a flow, matches the security rule, then the packet is not allowed to enter the network. The packet is blocked at the edge, thereby saving resources from being wasted inside the network.

In the exemplary embodiment of FIG. 3, an attacker 316 has spoofed the IP address of client 126, creating an attack sending packets with that source IP address 1.1.1.1. It is also possible, that the attack is a DDoS attack, and more than one computer is spoofing the same source IP address.

Security engine 312 is in communication with the gaming platform (e.g., streaming server 318) and periodically, or on demand, collects a whitelist from the gaming service. The whitelist includes information about legitimate users, such as their source IP address and the geographic location where the legitimate users are situated (e.g., Pacific West Coast of the United States). In other embodiments, the whitelist is "pushed" periodically by the game servers to the security engine, where the complete whitelist, or updates to the whitelist, are transmitted to the security engine in the security controllers.

Security engine 312 examines the blacklist 308 and the whitelist 316 to generate one or more safe blacklists. A safe blacklist contains a list of users to be blocked by an edge router. Security engine 312 does not add the source IP address of a legitimate user to the safe blacklist for the router being used to route packets of the legitimate user. This way the edge router does not block a legitimate user where the legitimate user is entering the private network. In other embodiments, the white list is "pushed" periodically from the security controller. That is, a whitelist can be either collected (generally periodically) or it can be pushed (generally in real-time)

The safe blacklists are configured to block attackers (e.g., by their source IP address) while allowing legitimate users to access the network. The source IP address being part of the attack is not blocked at the router corresponding to the geographic location where the legitimate user is accessing the network, but the same IP address is blocked at other routers providing access to other geographic locations. In one embodiment, the safe blacklist also includes the amount of time for which to block the identified IP address/es.

In the example of FIG. 3, a blacklist 308 includes four source IP addresses determined to be used for security attacks: 1.1.1.1, 2.2.2.2, 3.3.3.3, and 4.4.4.4. Whitelist 316 includes IP address 1.1.1.1 associated with geographic location Geo1. Security engine 312 correlates the data from blacklist 308 and whitelist 316 to determine the safe blacklists for the four routers 206a-206d.

The safe blacklist 306a for router 206a does not include the source IP address 1.1.1.1 of the legitimate user because the legitimate user is entering the game network through router 206a. This way, the legitimate user 114 is allowed access to the network. Thus, safe blacklist 306a includes IP addresses 2.2.2.2, 3.3.3.3, and 4.4.4.4. Therefore, packets with source IP address 1.1.1.1 will not be blocked by router 206a.

It is noted that if a malicious user attacks the service from the same geographic location (e.g., through router 206a) as the legitimate user, the packets sent by the malicious user will be allowed to enter the network. This is the price to pay to allow legitimate users access to the network at all times. Of course, other security measures may be taken down the packet path to discard or handle the malicious packet.

On the other hand, the safe blacklist 306b for the routers 206b-206d, which are not part of the legitimate user traffic path, includes the IP address 1.1.1.1 being spoofed. Thus, safe blacklist 306b includes IP addresses 1.1.1.1, 2.2.2.2, 3.3.3.3, and 4.4.4.4. Thus, routers 206b-206d will block packets with a source IP address 1.1.1.1 as these packets come into the network from a different geographical region.

The traffic information is correlated with the data for legitimate users (e.g., whitelist), and the location where the legitimate users are located. For example, there is a legitimate user in California using the service, so the user is added to a related whitelist for the corresponding geographic region (e.g., the west coast of the United States). If an attacker spoofs the legitimate user in California and enters the network through the west coast of the United States, then the attacker is not blocked because it is not possible to differentiate between the legitimate and the illegitimate users. But if the attack comes from Europe or China, then the attackers from Europe or China are blocked, because it is not expected that the legitimate user access the service from those regions.

The safe blacklists can be transmitted using Border Gateway Protocol (BGP), or internal Border Gateway Protocol (iBGP), or any other communication protocol to send information to the routers. In one embodiment, to block a certain IP address, a discard route command is sent for that source IP address.

Remotely triggered black hole (RTBH) filtering is a technique that provides the ability to drop undesirable packets before the packets enter a protected network. A black hole, from a network security perspective, is a place in the network where packets are received and then dropped. Once an attack has been detected, black holing can be used to drop all attack traffic at the edge of a network, based on either destination IP address, or source IP addresses, or some other parameter. RTBH filtering uses routing protocol updates to manipulate route tables at the edge routers, or anywhere else in the network, to specifically drop undesirable packets before the packets enter the service provider network. Source-based black holes provide the ability to drop traffic at the network edge based on a specific source IP address or a range of source IP addresses.

In one embodiment, packets can be filtered out quickly, based on either source addresses or destination addresses, by forwarding the packets to a null0 interface, which is a pseudo-interface that is always up and can never forward or receive traffic. This means, that forwarding the packets to the a null0 interface results in dropping the packet.

A critical advantage of this type of filtering is that most routers are able to check the source or destination IP addresses in hardware, at line speeds. Therefore, the filtering of packets, even in the presence of a large number of filter addresses, can be done quickly and without straining the resources of the router.

In several embodiments, threat detection and mitigation happens in almost-real time. An attack may have hundreds of thousands of attackers and there may be whitelists with hundreds of thousands of users at different geographical regions. Therefore, the amount of permutations for blacklists and whitelists can become very large very quickly, but the embodiments presented allow for quick detection and mitigation. Once the rules are defined, no administrator intervention is required to update the safe blacklists in virtually real time.

Further, it is noted that the blacklists and whitelist are updated periodically, so all data is flashed out. This way, if the user from California goes on a trip to Tokyo, the user will be able to access the service in Tokyo because the network will detect the change in the geographical location of the user.

Additionally, it is noted that transferring the safe blacklist of the routers may be performed by transmitting the whole safe blacklist in one operation, or by transmitting incremental additions or deletions to the safe blacklist. For example, if a new threat is detected, an update to the required routers is sent to block the source IP address for the newly detected threat.

It is noted that the embodiments illustrated in FIGS. 2 and 3 are exemplary. Other embodiments may utilize different protocols, data structures, network equipment, network topology, etc. The embodiments illustrated in FIGS. 2 and 3 should therefore not be interpreted to be exclusive or limiting, but rather exemplary or illustrative.

Further, in other embodiments, the management of access control is performed by a method somewhat similar to an inverse logic of the method described above. In these embodiments, all the IP addresses are blocked by default at some of the routers within the network. This means that, for some of these internal routers, the safe blacklist has all IP addresses to begin with. In one embodiment, the safe blacklist is edited to allow communications by the elements inside the network, i.e., the devices under the control of the service provider. This way, users are blocked from accessing the service, but access is not blocked to access the servers that authenticate the users.

This control allows for the protection of certain components within the network that would not be hit by users until they have authenticated themselves via another system. Once a user is validated, the user is given access to the internal routers, which enables the user to start utilizing the service (e.g., to play a game being streamed to the user). This is done by deleting the IP addresses of the validated user from the safe blacklist in the router/s that block access by default. In this embodiment, the IP addresses are deleted from the safe blacklist by "pushing" the whitelist to the routers, and then the routers updating their blacklist to always have the safe blacklist. It is noted, that the whitelist for a user is pushed to the routers geographically associated with the access by the user, so access is not given for a potential attacker that spoofs the user in a different geographical location.

The rest of the operations for the embodiment that starts with the universal IP address blacklist are similar to the embodiments described with reference to FIG. 3, except that in this case there is no need for detecting attacks as all IP addresses are blocked by default. The automatic real-time whitelist correlation still takes place, but the security engine transmits the appropriate whitelists to the routers instead of transmitting the safe blacklists.

Figure 4:
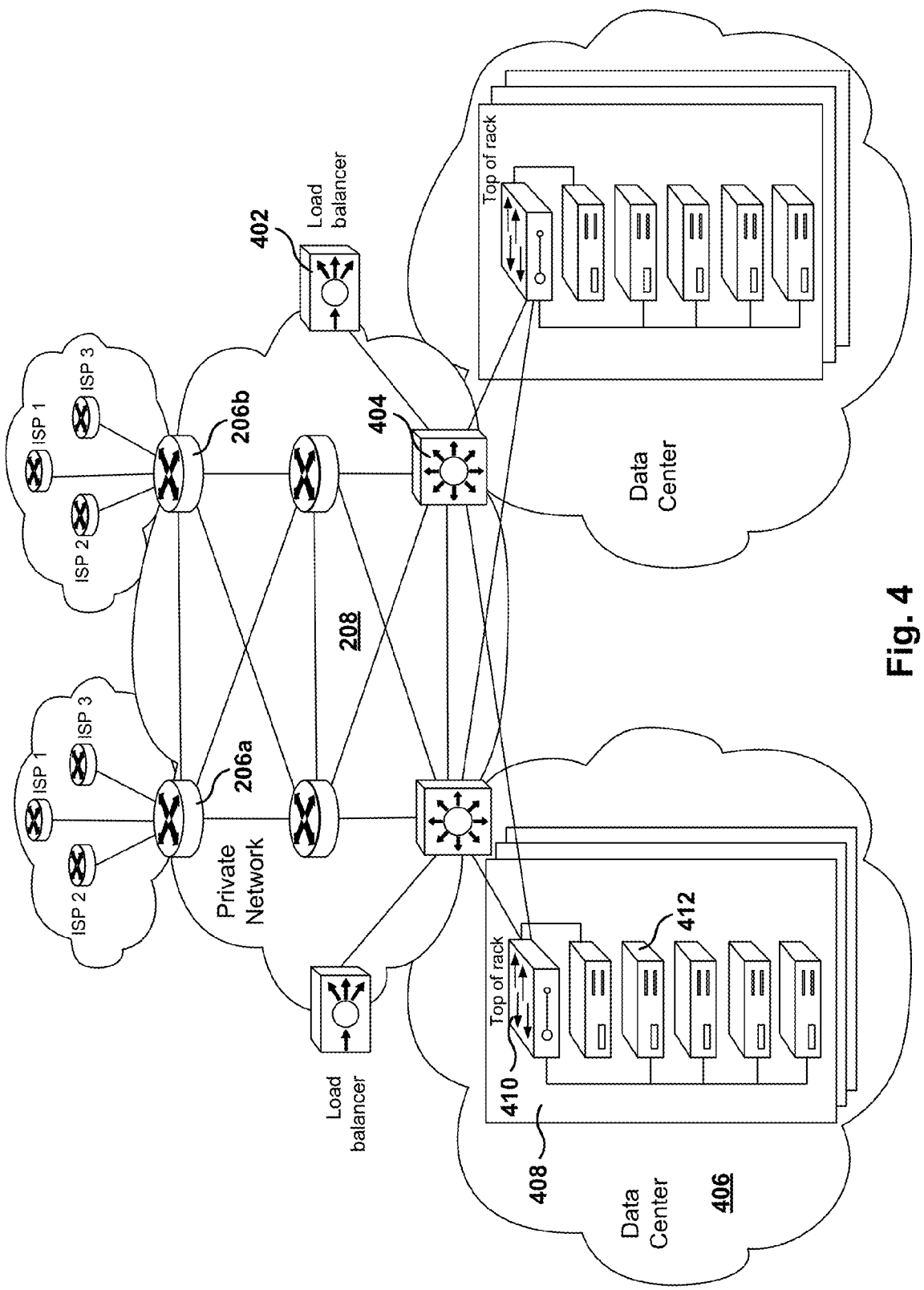
FIG. 4 is a diagram of the equipment and network for providing a gaming streaming service, according to one embodiment

FIG. 4 is a diagram of the equipment and network for providing a gaming streaming service, according to one embodiment. A data center 406 includes one or more streaming clusters that include a plurality of servers 412 organized in one or more racks, with top of rack switches 410 providing network access for the servers 412.

The streaming clusters provide access to the gaming network, including maintaining the profile of the user, life interactive game streaming, saving status of games, maintaining friendship status with other users in the gaming network, etc. For example, one streaming cluster may include five racks, with one 10 Gb server per rack and four 1 Gb server per rack.

The gaming network 208 includes a plurality of routers, and load balancers 402 are used to perform load balancing among the different clusters and servers. The edge routers 206a-206b are connected to ISPs, and users enter the game network through the ISPs internet connections.

FIG. 5 is a user interface for managing security alerts, according to one embodiment. FIG. 5 is an exemplary user interface for creating, modifying, or deleting alerts for the alerts database. Attacks are detected by analyzing the behavior of the packets and the flows that reach the routers, and this analysis is defined by the security rules. The rules can be added, changed, or deleted at any time and can be based on many different types of information provided by the routers and/or the streaming service.

In one embodiment, the user interface includes the following fields:

Name 502, for entering the name for the security alert rule;

Description 504, for entering text describing the purpose and function of the security alert rule. For example, this alert detects if a flow originating in Russia includes more than 25 Mb/second of data or more than twenty-five thousand packets per second;

Rule logic 506, for entering the logic used to process the traffic information. For example, the rule logic may include database access commands (e.g., SQL commands), or program instructions (e.g., Java). The rule logic interface may also include parameter fields for entering simple parameters (e.g., flow has more than n packets per second) for predefined actions, and these actions are then translated into computer instructions or commands;

Triggers 508, for entering the triggers that trip this alert. In one embodiment, the triggers are defined within the rule logic;

Actions 510, for entering actions to be taken when the alert is tripped, such as writing to a log, sending an alert to one or more security controllers, sending an email, a text message, or a page to a system administrator, etc.;

Output parameters 512, which indicate the parameters generated by the rule logic when the alarm is triggered, such as the IP address under attack, the number of packets per second, or the traffic in megabits per second;

Schedule 514, for entering at what times the alert is active (e.g., always, weekends, a time interval during the day, etc.);

Time window 516, for entering a window of time for the data to be analyzed (e.g., every minute);

Severity 518, for selecting a severity level (e.g., Critical, Serious, Moderate);

It is noted that the embodiment illustrated in FIG. 5 is exemplary. Other embodiments may utilize different fields, different layouts, additional fields, etc. The embodiment illustrated in FIG. 5 should therefore not be interpreted to be exclusive or limiting, but rather exemplary or illustrative.

In one embodiment, the detection is not performed by the routers at the edge, but rather by the security controllers that receive the information from the routers. The routers can receive the filtering commands from the security controller, or from some other application that may detect an attack (e.g., game streaming application detecting too many new users in a short period of time). The application running in the data center may detect that it is under attack and then send a request to the security controller (or to the routers) notifying of the attack and requesting mitigating measures to defend from the attack. The security controller will take corrective action to block the attack, but allowing legitimate users to access the service.

Another example of a rule is a rule that detects if too many people are trying to connect to one of the streaming servers. In one example, the average number of users connected to the server is 50, but suddenly the server detects hundred people trying to connect to this server. In this case, an alert is generated to flag the hundred new people trying to connect as potential attackers, and adding them temporarily to the blacklist. If 20 of those hundred requesters are determined to be legitimate users, then their information is added to the whitelist, so they are not included in that safe blacklist.

In another example, the security rule checks for too much traffic to an IP address inside the network. If a given IP address inside the network is getting more than a threshold amount of traffic (e.g., 1 Gb per second, or 100,000 packets per second), then an alert is generated because this IP address inside the network should not receive this much traffic. In response, the clients generating the sudden burst of traffic are added to the blacklist.

The data used for the security rules can be of many types and from many sources. One of the data sources is the information provided by the routers. In one embodiment, the data is collected utilizing IPFIX, but any other network protocol may be used. IPFIX provides a rich set of traffic data, such as, source and destination IP addresses, protocols, source and destination ports, ingress port on the router for a packet, timestamps, QoS (Quality of Service) bit, etc.

Below is a list of sample parameters supported by IPFIX described in Table 1 below:

TABLE 1

| Name | Type | Description |
| --- | --- | --- |
| octetDeltaCount | deltaCounter | The number of octets since the previous report (if any) in incoming packets for this Flow at the Observation Point. The number of octets includes IP header(s) and IP payload. |
| packetDeltaCount | deltaCounter | The number of incoming packets since the previous report (if any) for this Flow at the Observation Point. |
| deltaFlowCount | deltaCounter | The conservative count of Original Flows contributing to this Aggregated Flow; may be distributed via any of the methods expressed by the valueDistributionMethod Information Element. |
| protocolIdentifier | identifier | The value of the protocol number in the IP packet header. The protocol number identifies the IP packet payload type. Protocol numbers are defined in the IANA Protocol Numbers registry. In Internet Protocol version 4 (IPv4), this is carried in the Protocol field. In Internet Protocol version 6 (IPv6), this is carried in the Next Header field in the last extension header of the packet. |
| ipClassOfService | identifier | For IPv4 packets, this is the value of the TOS field in the IPv4 packet header. For IPv6 packets, this is the value of the Traffic Class field in the IPv6 packet header. |
| sourceTransportPort | identifier | The source port identifier in the transport header. For the transport protocols UDP, TCP, and SCTP, this is the source port number given in the respective header. This field MAY also be used for future transport protocols that have 16-bit source port identifiers. |
| sourceIPv4Address | default | The IPv4 source address in the IP packet header. |
| ingressInterface | identifier | The index of the IP interface where packets of this Flow are being received. The value matches the value of managed object 'ifIndex' as defined in [RFC2863]. Note that ifIndex values are not assigned statically to an interface and that the interfaces may be renumbered every time the device's management system is re-initialized, as specified in [RFC2863]. |
| destinationTransportPort | identifier | The destination port identifier in the transport header. For the transport protocols UDP, TCP, and SCTP, this is the destination port number given in the respective header. This field MAY also be used for future transport protocols that have 16-bit destination port identifiers. |
| destinationIPv4Address | default | The IPv4 destination address in the IP packet header. |
| egressInterface | identifier | The index of the IP interface where packets of this Flow are being sent. The value matches the value of managed object 'ifIndex' as defined in [RFC2863]. Note that ifIndex values are not assigned statically to an interface and that the interfaces may be renumbered every time the device's management system is re-initialized, as specified in [RFC2863]. |
| ipNextHopIPv4Address | default | The IPv4 address of the next IPv4 hop. |
| bgpSourceAsNumber | identifier | The autonomous system (AS) number of the source IP address. If AS path information for this Flow is only available as an unordered AS set (and not as an ordered AS sequence), then the value of this Information Element is 0. |
| bgpDestinationAsNumber | identifier | The autonomous system (AS) number of the destination IP address. If AS path information for this Flow is only available as an unordered AS set (and not as an ordered AS sequence), then the value of this Information Element is 0. |
| bgpNextHopIPv4Address | default | The IPv4 address of the next (adjacent) BGP hop. |

TABLE 1-continued

| Name | Type | Description |
| --- | --- | --- |
| postMCastPacketDeltaCount | deltaCounter | The number of outgoing multicast packets since the previous report (if any) sent for packets of this Flow by a multicast daemon within the Observation Domain. This property cannot necessarily be observed at the Observation Point, but may be retrieved by other means. |
| postMCastOctetDeltaCount | deltaCounter | The number of octets since the previous report (if any) in outgoing multicast packets sent for packets of this Flow by a multicast daemon within the Observation Domain. This property cannot necessarily be observed at the Observation Point, but may be retrieved by other means. The number of octets includes IP header(s) and IP payload. |
| flowEndSysUpTime | | The relative timestamp of the last packet of this Flow. It indicates the number of milliseconds since the last (re-) initialization of the IPFIX Device (sysUpTime). sysUpTime can be calculated from systemInitTimeMilliseconds. |
| flowStartSysUpTime | | The relative timestamp of the first packet of this Flow. It indicates the number of milliseconds since the last (re-) initialization of the IPFIX Device (sysUpTime). sysUpTime can be calculated from systemInitTimeMilliseconds. |

It is noted that the parameters illustrated in Table 1 are exemplary. Other embodiments may utilize different parameters, or collect data with other protocols, or from other applications. The parameters illustrated in Table 1 should therefore not be interpreted to be exclusive or limiting, but rather exemplary or illustrative.

Figure 6:
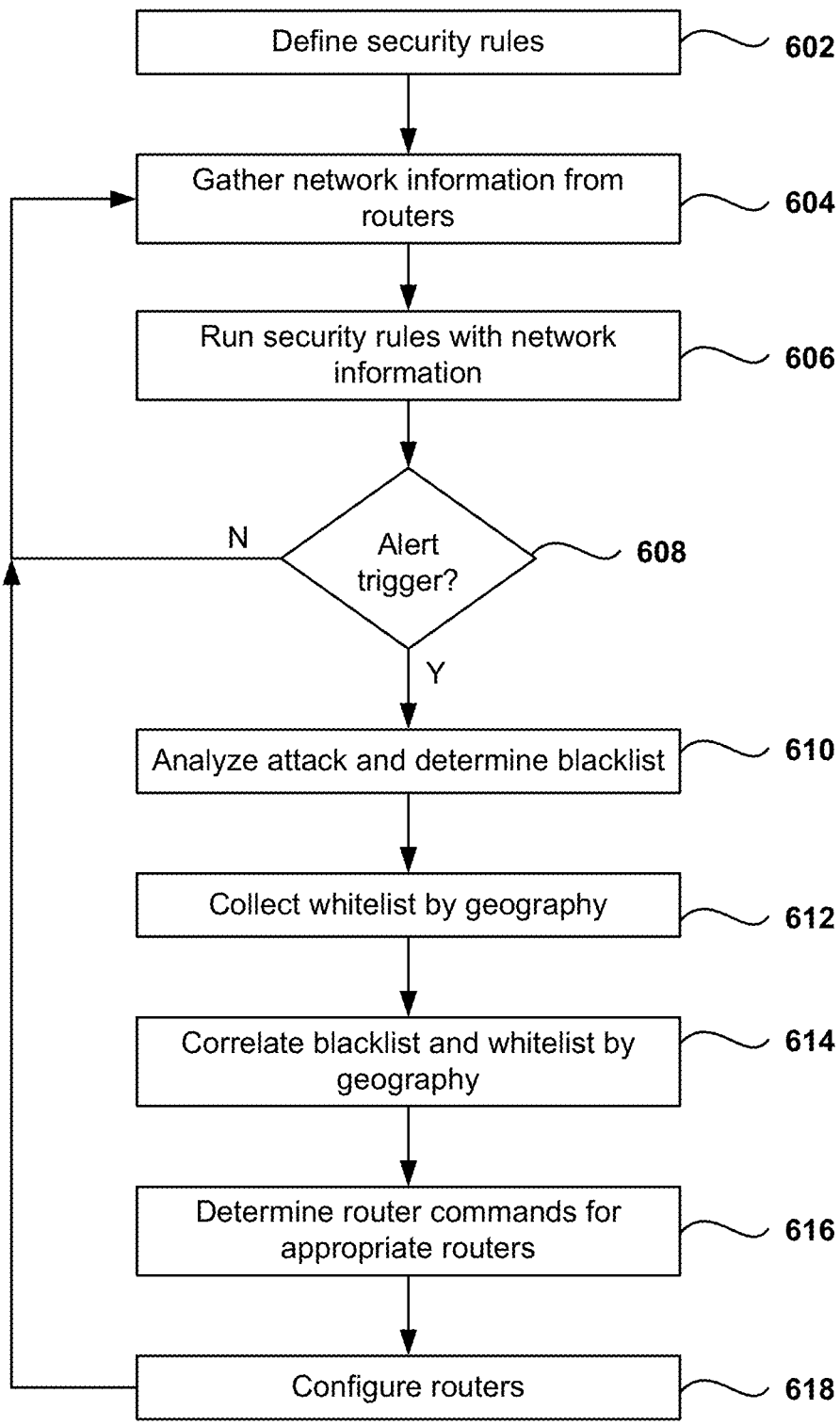
FIG. 6 is a flowchart of a method for automatic mitigation of DDoS attacks, according to one embodiment.

FIG. 6 is a flowchart of a method for automatic mitigation of DDoS attacks, according to one embodiment. The benefits of the embodiments presented for DDoS detection and mitigation tie together, in real-time, the attack detection and mitigation in a safe manner that protects legitimate users. The correlation engine provides the ability to react to a real-time attack fast and mitigate automatically, without requiring human intervention before the mitigation takes place.

The number of permutations when watching the safe blacklist could be in the thousands or millions. It would be difficult to defend and attack if 100,000 people are attacking simultaneously, because all those IP addresses need to be checked in real-time. The solutions presented here mitigate attacks quickly, before the attacks damage the service. For some service providers, having the service down for 20 or 30 minutes results in customer dissatisfaction and a large loss of revenue.

Returning to FIG. 6, while the various operations in this flowchart are presented and described sequentially, one of ordinary skill will appreciate that some or all of the operations may be executed in a different order, be combined or omitted, or be executed in parallel.

In operation 602, security rules are defined for detecting attacks on the service. From operation 602, the method flows to operation 604 where the network traffic information is gathered from the routers in the network.

From operation 604, the method flows to operation 606 where the security rules are correlated against the information gathered in operation 604. In operation 608, a check is made to determine if an alert was triggered. If the alert was not triggered, the method flows back to operation 604 to continue gathering network information. If an alert is triggered, the method flows to operation 610, where the attack is analyzed and the blacklist is determined. In one embodiment, a new blacklist is identified, but in other embodiments, the blacklist is continuously updated based on potential threats.

From operation 610, the method flows to operation 612 where the whitelist is collected by geography. This means, that the whitelist includes information about the legitimate users (e.g., source IP address), as well as geographic information regarding the location of each of the legitimate users.

From operation 612, the method flows to operation 614 where the blacklist and the whitelist are correlated by geography in order to allow legitimate users access to the service, and blocking attackers trying to spoof legitimate users from geographic locations that are different from the geographic location of the legitimate users.

From operation 614, the method flows to operation 616 where the method determines the commands needed for the routers to filter the packets according to the safe blacklist. In operation 618, the commands are transmitted to the routers in order to perform the desired filtering. In one embodiment, the filtering is performed by discarding packets, which is done by configuring BGP routes in the routers where the next hop is associated with a parameter that means "discard" (e.g., null value).

Figure 7:
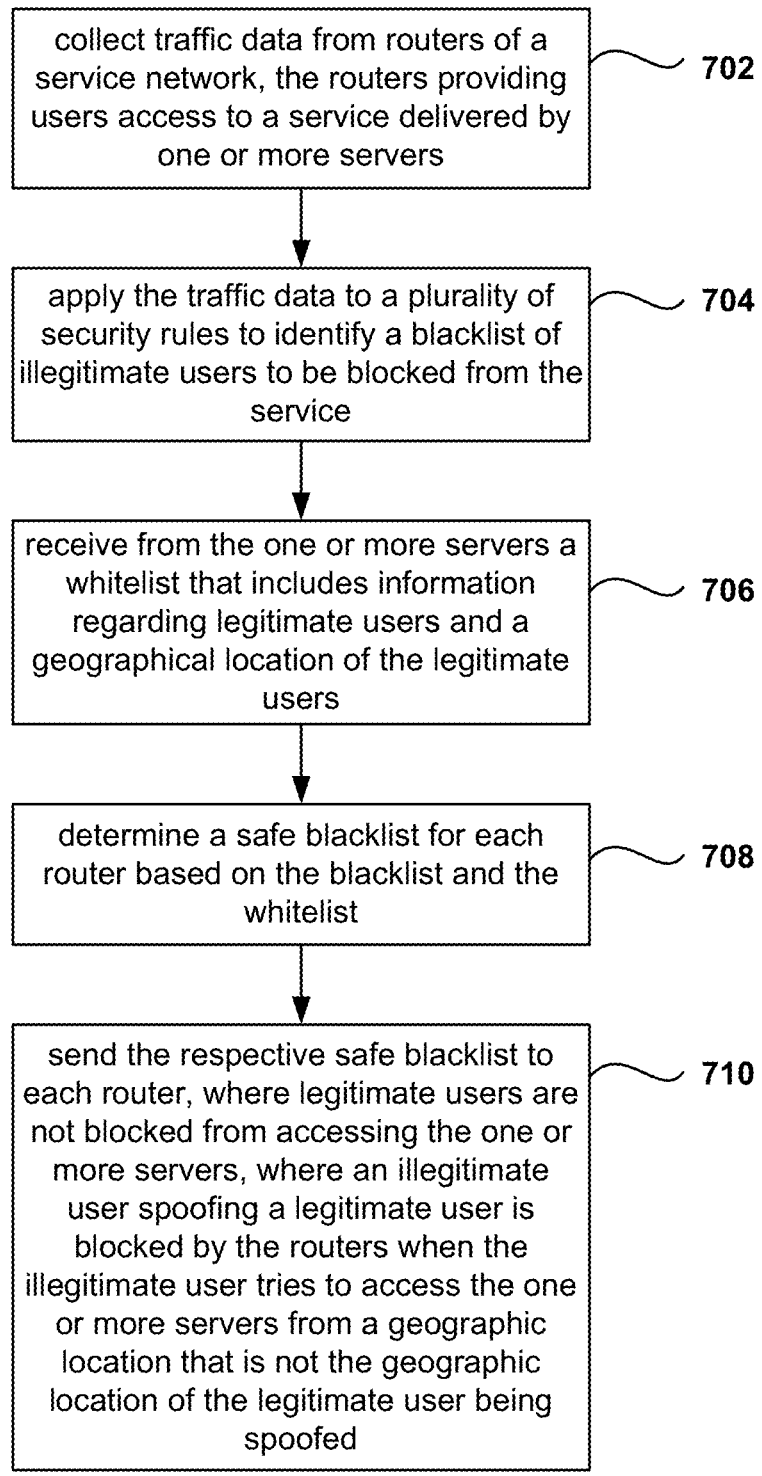
FIG. 7 is a flowchart of a method for automated detection and mitigation of denial of service attacks, according to one embodiment.

FIG. 7 is a flowchart of a method for automated detection and mitigation of Denial of Service (DoS) attacks, according to one embodiment. While the various operations in this flowchart are presented and described sequentially, one of ordinary skill will appreciate that some or all of the operations may be executed in a different order, be combined or omitted, or be executed in parallel.

In operation 702, traffic data is collected from routers of a service network. The routers provide users access to a service delivered by one or more servers. Operation 704 is for applying the traffic data to a plurality of security rules to identify a blacklist of illegitimate users to be blocked from the service.

From operation 704, the method flows to operation 706 where a whitelist is received from the one or more servers. The whitelist includes information regarding legitimate users and the geographical location of the legitimate users.

Operation 708 is for determining a safe blacklist for each router based on the blacklist and the whitelist, and in operation 710, the respective safe blacklist is sent to each router. Legitimate users are not blocked from accessing the one or more servers, but an illegitimate user, spoofing a legitimate user, is blocked by the routers when the illegitimate user tries to access the one or more servers from a geographic location that is not the geographic location of the legitimate user being spoofed.

It should be appreciated that the methods described herein may be performed with a digital processing system, such as a conventional, general-purpose computer system. In one embodiment, the computer system includes, at least, a processor or central processing unit (CPU), random access memory (RAM), read-only memory (ROM), Input/Output ports, and a mass storage device, which represents a persistent data storage device, which may be local or remote. A network interface provides connections via a network. In one embodiment, a display is configured to display the user interfaces described herein. The embodiments can also be practiced in distributed computing environments where tasks are performed by remote processing devices that are linked through a wire-based or wireless network.

Figure 8:
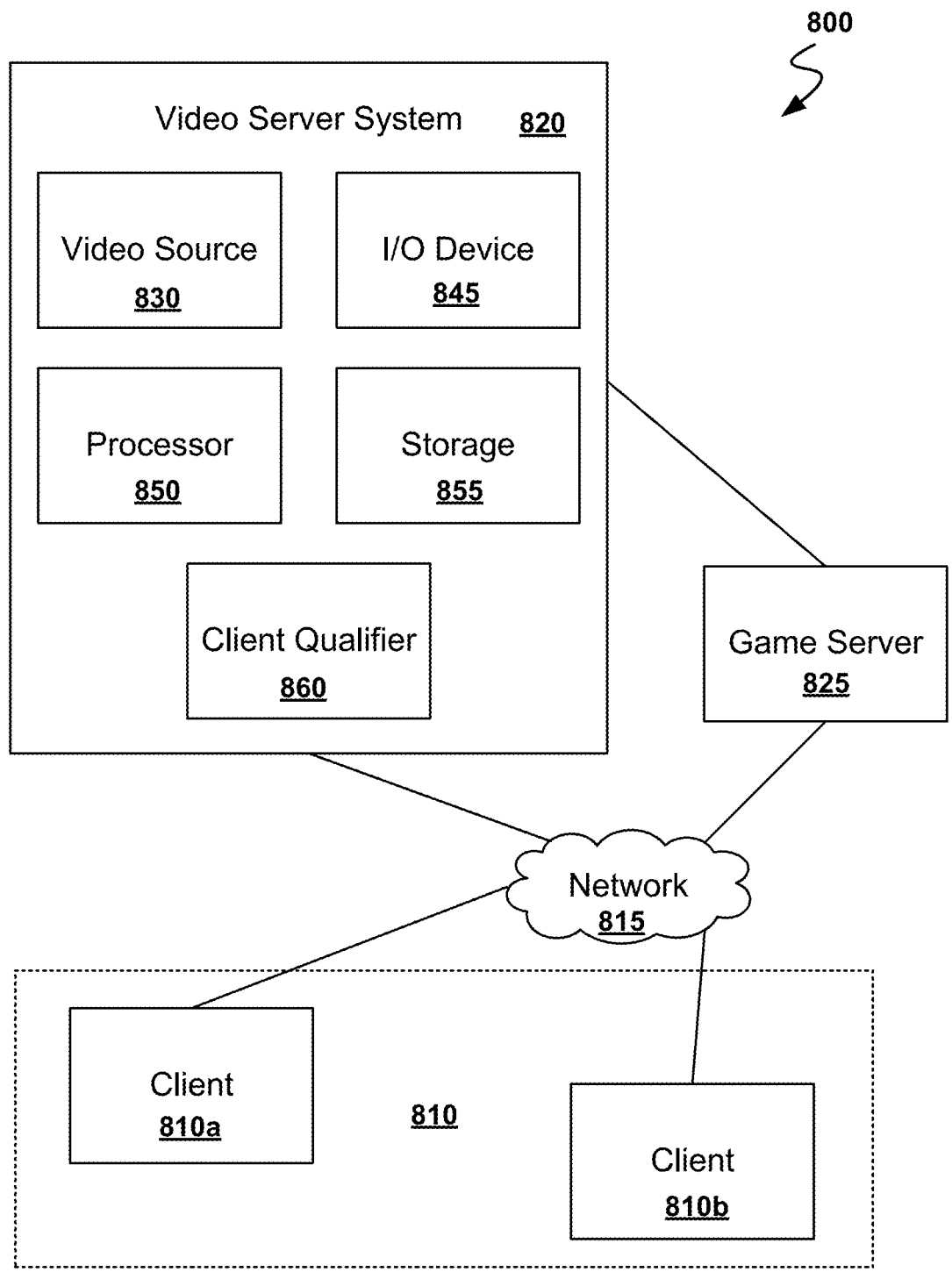
FIG. 8 is a block diagram of a game system, according to various embodiments.

FIG. 8 is a block diagram of a game system, according to various embodiments. Game System 800 is configured to provide a video stream to one or more Clients 810 via a Network 815. Game System 800 typically includes a Video Server System 820 and an optional game server 825. Video Server System 820 is configured to provide the video stream to the one or more clients 810 with a minimal quality of service. For example, Video Server System 820 may receive a game command that changes the state of or a point of view within a video game, and provide clients 810 with an updated video stream reflecting this change in state with minimal lag time. The Video Server System 820 may be configured to provide the video stream in a wide variety of alternative video formats.

Clients 810, referred to herein individually as 810a, 810b, etc., may include head mounted displays, terminals, personal computers, game consoles, tablet computers, telephones, set top boxes, kiosks, wireless devices, digital pads, stand-alone devices, handheld game playing devices, and/or the like. Typically, clients 810 are configured to receive encoded video streams, decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to client 810 or on a separate device such as a monitor or television. Clients 810 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 810 are optionally geographically dispersed. The number of clients included in game system 800 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and a Head-Mounted Display (HMD) may cooperate with the video server system 820 to deliver a game viewed through the HMD. In one embodiment, the game console receives the video stream from the video server system 820, and the game console forwards the video stream, or updates to the video stream, to the HMD for rendering.

Clients 810 are configured to receive video streams via network 815, which may be any type of communication network including, a telephone network, the Internet, wireless networks, powerline networks, local area networks, wide area networks, private networks, and/or the like. In some embodiments, the video streams are communicated via standard protocols, such as TCP/IP or UDP/IP. Alternatively, the video streams are communicated via proprietary standards.

A typical example of clients 810 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 810 may, but are not required to, further include systems configured for modifying received video. For example, a client may be configured to perform further rendering, to overlay one video image on another video image, to crop a video image, and/or the like. For example, clients 810 may be configured to receive various types of video frames, such as I-frames, P-frames and B-frames, and to process these frames into images for display to a user. In some embodiments, a member of clients 810 is configured to perform further rendering, shading, conversion to 3D, optical distortion processing for HMD optics, or like operations on the video stream. A member of clients 810 is optionally configured to receive more than one audio or video stream. Input devices of clients 810 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally the audio stream) received by clients 810 is generated and provided by Video Server System 820. This video stream includes video frames, and the audio stream includes audio frames. The video frames are configured (e.g., they include pixel information in an appropriate data structure) to contribute meaningfully to the images displayed to the user. As used herein, the term "video frames" is used to refer to frames including predominantly information that is configured to contribute to (e.g., to affect) the images shown to the user. Most of the teachings herein with regard to "video frames" can also be applied to "audio frames."

Clients 810 are typically configured to receive inputs from a user. These inputs may include game commands configured to change the state of the video game or otherwise affect game play. The game commands can be received using input devices and/or may be automatically generated by computing instructions executing on clients 810. The received game commands are communicated from clients 810 via network 815 to Video Server System 820 and/or game server 825. For example, in some embodiments, the game commands are communicated to game server 825 via Video Server System 820. In some embodiments, separate copies of the game commands are communicated from clients 810 to game server 825 and Video Server System 820. The communication of game commands is optionally dependent on the identity of the command. Game commands are optionally communicated from client 810*a* through a different route or communication channel that that used to provide audio or video streams to client 810*a*.

Game server 825 is optionally operated by a different entity than Video Server System 820. For example, game server 825 may be operated by the publisher of a multiplayer game. In this example, Video Server System 820 is optionally viewed as a client by game server 825 and optionally configured to appear from the point of view of game server 825 to be a prior art client executing a prior art game engine. Communication between Video Server System 820 and game server 825 optionally occurs via network 815. As such, game server 825 can be a prior art multiplayer game server that sends game state information to multiple clients, one of which is game server system 820. Video Server System 820 may be configured to communicate with multiple instances of game server 825 at the same time. For example, Video Server System 820 can be configured to provide a plurality of different video games to different users. Each of these different video games may be supported by a different game server 825 and/or published by different entities. In some embodiments, several geographically distributed instances of Video Server System 820 are configured to provide game video to a plurality of different users. Each of these instances of Video Server System 820 may be in communication with the same instance of game server 825. Communication between Video Server System 820 and one or more game servers 825 optionally occurs via a dedicated communication channel. For example, Video Server System 820 may be connected to game server 825 via a high bandwidth channel that is dedicated to communication between these two systems.

Video Server System 820 comprises at least a video source 830, an I/O device 845, a processor 850, and non-transitory storage 855. Video Server System 820 may include one computing device or be distributed among a plurality of computing devices. These computing devices are optionally connected via a communications system such as a local area network.

Video source 830 is configured to provide a video stream, e.g., streaming video or a series of video frames that form a moving picture. In some embodiments, Video source 830 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects. The game state is typically maintained based on game rules, as well as game commands such as move, turn, attack, set focus to, interact, use, and/or the like. Part of the game engine is optionally disposed within game server 825. Game server 825 may maintain a copy of the state of the game based on game commands received from multiple players using geographically disperse clients. In these cases, the game state is provided by game server 825 to video source 830, wherein a copy of the game state is stored and rendering is performed. Game server 825 may receive game commands directly from clients 810 via network 815, and/or may receive game commands via Video Server System 820.

Video source 830 typically includes rendering logic, e.g., hardware, firmware, and/or software stored on a computer readable medium such as storage 855. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to clients 810. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720 p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments video source 830 includes a video recording device such as a camera. This camera may be used to generate delayed or live video that can be included in the video stream of a computer game. The resulting video stream optionally includes both rendered images and images recorded using a still or video camera. Video source 830 may also include storage devices configured to store previously recorded video to be included in a video stream. Video source 830 may also include motion or positioning sensing devices configured to detect motion or position of an object, e.g., person, and logic configured to determine a game state or produce video-based on the detected motion and/or position.

Video source 830 is optionally configured to provide overlays configured to be placed on other video. For example, these overlays may include a command interface, log-in instructions, messages to a game player, images of other game players, video feeds of other game players (e.g., webcam video). In embodiments of client 810*a* including a touch screen interface or a gaze detection interface, the overlay may include a virtual keyboard, joystick, touch pad, and/or the like. In one example of an overlay a player's voice is overlaid on an audio stream. Video source 830 optionally further includes one or more audio sources.

In embodiments wherein video server system 820 is configured to maintain the game state based on input from more than one player, each player may have a different point of view comprising a position and direction of view. Video source 830 is optionally configured to provide a separate video stream for each player based on their point of view. Further, video source 830 may be configured to provide a different frame size, frame data size, and/or encoding to each of client 810. Video source 830 is optionally configured to provide 3D video.

I/O device 845 is configured for video server system 820 to send and/or receive information such as video, commands, requests for information, a game state, gaze information, device motion, device location, user motion, client identities, player identities, game commands, security information, audio, and/or the like. I/O device 845 typically includes communication hardware such as a network card or modem. I/O device 845 is configured to communicate with game server 825, network 815, and/or clients 810.

Processor 850 is configured to execute logic, e.g. software, included within the various components of video server system 820 discussed herein. For example, processor 850 may be programmed with software instructions in order to perform the functions of video source 830, game server 825, and/or a client qualifier 860. Video server system 820 optionally includes more than one instance of processor 850. Processor 850 may also be programmed with software instructions in order to execute commands received by video server system 820, or to coordinate the operation of the various elements of Game System 800 discussed herein. Processor 850 may include one or more hardware device. Processor 850 is an electronic processor.

Storage 855 includes non-transitory analog and/or digital storage devices. For example, storage 855 may include an analog storage device configured to store video frames. Storage 855 may include a computer readable digital storage, e.g. a hard drive, an optical drive, or solid state storage. Storage 815 is configured (e.g. by way of an appropriate data structure or file system) to store video frames, artificial frames, a video stream including both video frames and artificial frames, audio frame, an audio stream, and/or the like. Storage 855 is optionally distributed among a plurality of devices. In some embodiments, storage 855 is configured to store the software components of video source 830 discussed elsewhere herein. These components may be stored in a format ready to be provisioned when needed.

Video server system 820 optionally further comprises client qualifier 860. Client qualifier 860 is configured for remotely determining the capabilities of a client, such as clients 810a or 810b. These capabilities can include both the capabilities of client 810a itself as well as the capabilities of one or more communication channels between client 810a and video server system 820. For example, client qualifier 860 may be configured to test a communication channel through network 815.

Client qualifier 860 can determine (e.g., discover) the capabilities of client 810a manually or automatically. Manual determination includes communicating with a user of client 810a and asking the user to provide capabilities. For example, in some embodiments, client qualifier 860 is configured to display images, text, and/or the like within a browser of client 810a. In one embodiment, client 810a is an HMD that includes a browser. In another embodiment, client 810a is a game console having a browser, which may be displayed on the HMD. The displayed objects request that the user enter information such as operating system, processor, video decoder type, type of network connection, display resolution, etc. of client 810a. The information entered by the user is communicated back to client qualifier 860.

Automatic determination may occur, for example, by execution of an agent on client 810a and/or by sending test video to client 810a. The agent may comprise computing instructions, such as java script, embedded in a web page or installed as an add-on. The agent is optionally provided by client qualifier 860. In various embodiments, the agent can find out processing power of client 810a, decoding and display capabilities of client 810a, lag time reliability and bandwidth of communication channels between client 810a and video server system 820, a display type of client 810a, firewalls present on client 810a, hardware of client 810a, software executing on client 810a, registry entries within client 810a, and/or the like.

Client qualifier 860 includes hardware, firmware, and/or software stored on a computer readable medium. Client qualifier 860 is optionally disposed on a computing device separate from one or more other elements of video server system 820. For example, in some embodiments, client qualifier 860 is configured to determine the characteristics of communication channels between clients 810 and more than one instance of video server system 820. In these embodiments the information discovered by client qualifier can be used to determine which instance of video server system 820 is best suited for delivery of streaming video to one of clients 810.

Figure 9:
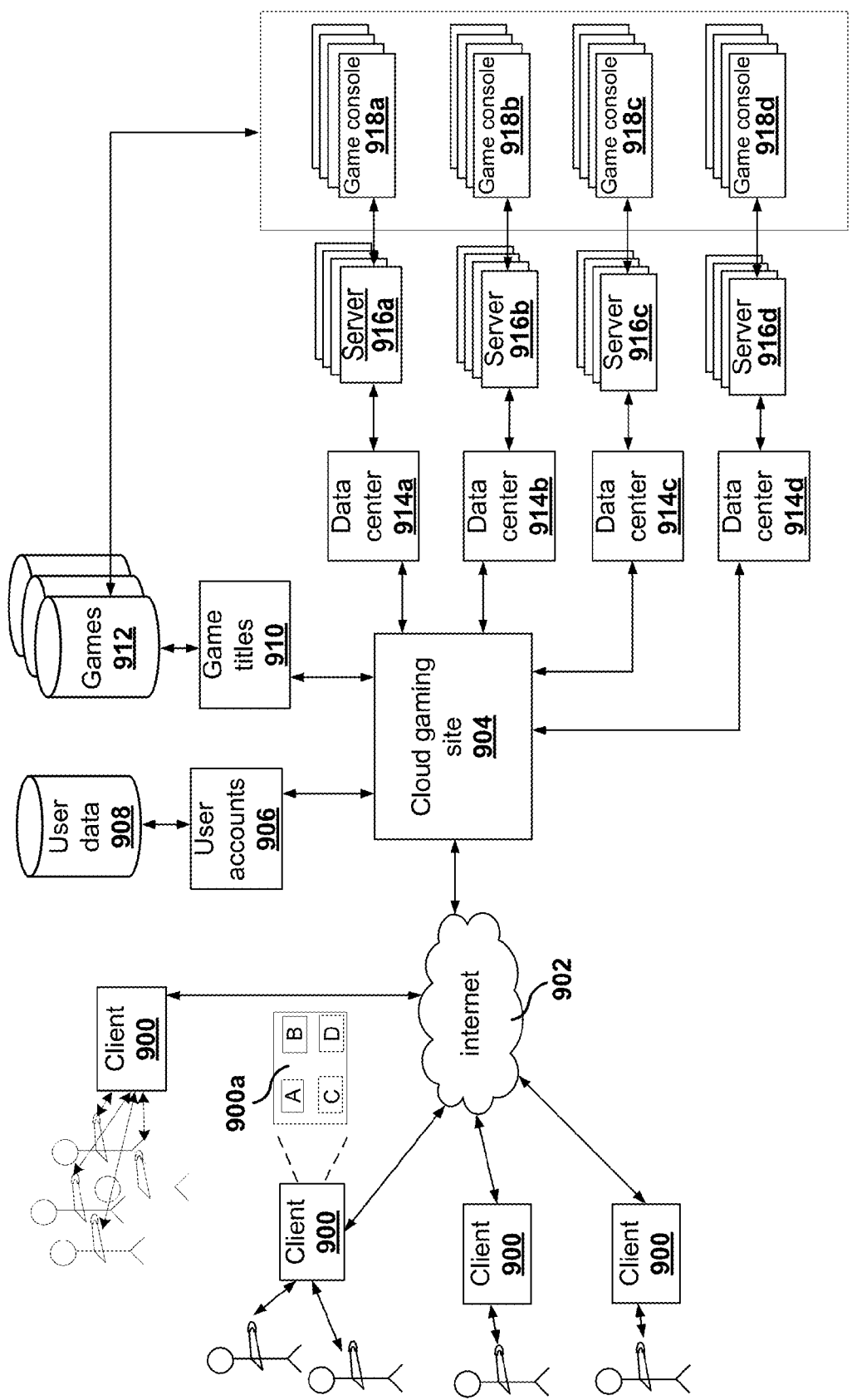
FIG. 9 illustrates a simplified block diagram of an exemplary system that is used to preload game content onto a cloud game server, in accordance with an embodiment.

FIG. 9 illustrates a simplified block diagram of an exemplary system that is used to preload game content onto a cloud game server, in accordance with an embodiment. FIG. 9 illustrates an exemplary system used to load game files for a game available through a cloud gaming site. The system includes a plurality of client devices 900 that are communicatively connected to the cloud gaming site 904 over a network 902, such as the Internet. When a request to access the cloud gaming site 904 is received from a client device 900, the cloud gaming site 904 accesses user account information 906 stored in a user data store 908 to identify a user associated with a client device through which the request is initiated. In some embodiments, the cloud gaming site may also validate the identified user in order to determine all the games the user is authorized to view/play. Following user account identification/validation, the cloud gaming site accesses a game titles data store 910 to identify the game titles that are available at the game cloud site for the user account initiating the request. The game titles data store 910, in turn, interacts with a games database 912 to obtain the game titles for all the games that are available for the cloud gaming site. As new games are introduced, the games database 912 will be updated with the game code and the game titles data store 910 will be provided with game titles information for the newly introduced games. The client device from where the request is initiated may or may not be registered with the cloud gaming site, when the request was initiated. If the user of the client device initiating the request is not a registered user, then the cloud gaming site may identify the user as a new user and select the game titles (for e.g., a default set of game titles) that are appropriate for a new user. The identified game titles are returned to the client device for presenting on a display screen 900a.

User interaction at one of the game titles rendered on the client device is detected and a signal is sent to the cloud gaming site. The signal includes the game title information where the user interaction was detected and the user interaction registered at the game title. In response to the signal received from the client device, the cloud gaming site proactively determines a data center where the game is being hosted and sends a signal to the identified data center to load the game associated with the game title for which the user interaction is detected. In some embodiments, more than one data center may be hosting the game. In such embodiments, the cloud gaming site may determine the geographic location of the client device initiating the request and identify a data center that is geographically close to the client device and signal the data center to pre-load the game. The geo location of the user may be determined using a Global Position System (GPS) mechanism within the client device, the client's IP address, the client's ping information, to name a few. Of course, the aforementioned ways to detect the geo location of the user may be exemplary and other types of mechanisms or tools may be used to determine the geo location of the user. Identification of a data center that is close to the client device can minimize latency during user interaction with the game. In some embodiments, the identified data center may not have the required bandwidth/capacity to host the game or may be overused. In these embodiments, the cloud gaming site may identify a second data center that is geographically close to the client device. The loading of the game includes loading game code and executing an instance of the game.

In response to receiving the signal from the cloud gaming site, the identified data center may select a server at the data center to instantiate the game on the server. The server is selected based on the hardware/software capabilities available and the game requirements. The server may include a plurality of game consoles and the server may determine which one of the plurality of game consoles to use to load the game. The game console may be similar to an independent game console, or may be a rack-mounted server or a blade server. The blade server, in turn, may include a plurality of server blades with each blade having required circuitry for instantiating a single dedicated application, such as the game. Of course, the game console described above is exemplary and should not be considered restrictive. Other types of game consoles, including game stations, etc., and other forms of blade server may also be engaged for hosting the identified game.

Once the game console is identified, the generic game-related code for the game is loaded onto the game console and a signal is returned to the client device via the cloud gaming site over the network identifying the game console on which the game is instantiated. The loaded game is thus made available to the user.

Figure 10:
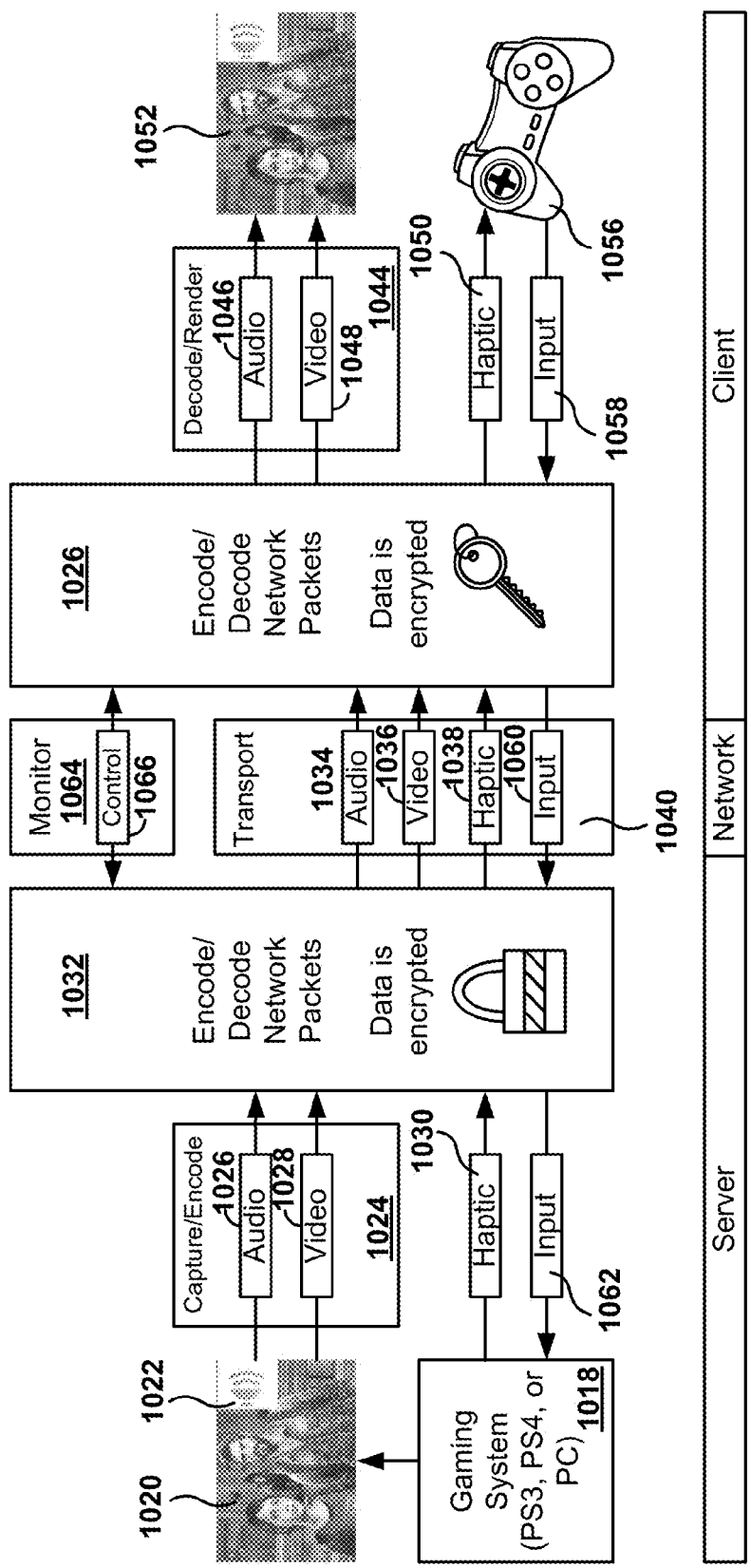
FIG. 10 is a flow diagram conceptually illustrating various operations which are performed for streaming a cloud video game to a client device, in accordance with implementations of the disclosure.

FIG. 10 is a flow diagram conceptually illustrating various operations which are performed for streaming a cloud video game to a client device, in accordance with implementations of the disclosure. The gaming system 1018 executes a video game and generates raw (uncompressed) video 1020 and audio 1022. The video 1020 and audio 1022 are captured and encoded for streaming purposes, as indicated at reference 1024 in the illustrated diagram. The encoding can provide for compression of the video and audio streams to reduce bandwidth usage and optimize the gaming experience. Examples of encoding formats include H.265/MPEG-H, H.264/MPEG-4, H.263/MPEG-4, H.262/MPEG-2, WMV, VP6/7/8/9, etc.

The encoded audio 1026 and encoded video 1028 are further packetized into network packets, as indicated at reference numeral 1032, for purposes of transmission over a network such as the Internet. The network packet encoding process can also employ a data encryption process, thereby providing enhanced data security. In the illustrated implementation, audio packets 1034 and video packets 1036 are generated for transport over the network, as indicated at reference 1040.

The gaming system 1018 additionally generates haptic feedback data 1030, which is also packetized into network packets for network transmission. In the illustrated implementation, haptic feedback packets 1038 are generated for transport over the network, as further indicated at reference 1040.

The foregoing operations of generating the raw video and audio and the haptic feedback data, encoding the video and audio, and packetizing the encoded audio/video and haptic feedback data for transport are performed on one or more servers which collectively define a cloud gaming service/system. As indicated at reference 1040, the audio, video, and haptic feedback packets are transported over a network, such as and/or including the Internet. The audio packets 1034, video packets 1036, and haptic feedback packets 1038, are decoded/reassembled by the client device to define encoded audio 1046, encoded video 1048, and haptic feedback data 1050 at the client device. If the data has been encrypted, then the network packets are also decrypted. The encoded audio 1046 and encoded video 1048 are then decoded by the client device, as indicated at reference 1044, to generate client-side raw audio and video data for rendering on a display device 1052. The haptic feedback data 1050 can be processed/communicated to produce a haptic feedback effect at a controller device 1056 or other interface device through which haptic effects can be rendered. One example of a haptic effect is a vibration or rumble of the controller device 1056.

It will be appreciated that a video game is responsive to user inputs, and thus, a similar procedural flow to that described above for transmission and processing of user input, but in the reverse direction from client device to server, can be performed. As shown, a user operating controller device 1056 may generate input data 1058. This input data 1058 is packetized at the client device for transport over the network to the cloud gaming system. The input data packets 1060 are unpacked and reassembled by the cloud gaming server to define input data 1062 on the server-side. The input data 1062 is fed to the gaming system 1018, which processes the input data 1062 to update the game state of the video game.

During transport 1040 of the audio packets 1034, video packets 1036, and haptic feedback packets 1038, the transmission of data over the network can be monitored to ensure the cloud game stream quality of service. For example, network conditions can be monitored as indicated by reference 1064, including both upstream and downstream network bandwidth, and the game streaming can be adjusted in response to changes in available bandwidth. That is, the encoding and decoding of network packets can be controlled based on present network conditions, as indicated by reference 1066.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive and not to be limited to the details given herein, but may be modified within the scope and equivalents of the appended claims.

What is claimed is:

1. A method comprising:
    collecting traffic data from routers of a service network, the routers providing users access to a service delivered by one or more servers;
    applying the traffic data to a plurality of security rules to identify a blacklist of illegitimate users to be blocked from the service;
    receiving from the one or more servers a whitelist, the whitelist including information regarding legitimate users and a geographical location of the legitimate users;
    determining a safe blacklist for each router based on the blacklist and the whitelist, such that a first router of said routers having a router geographic location that is part of a first geographic location of a legitimate user is associated the safe blacklist that does not include the legitimate user, and remaining ones of said routers not having the router geographic location is associated with the safe blacklist that does include the legitimate user; and
    sending the respective safe blacklist and not the whitelist to each router, wherein the legitimate user is not blocked from accessing the one or more servers via the first router by the safe blacklist, wherein an illegitimate user spoofing the legitimate user is blocked by said remaining ones of said routers using said safe blacklist when the illegitimate user tries to access the one or more servers from a geographic location that is not the first geographic location of the legitimate user being spoofed.

2. The method as recited in claim 1, wherein determining the safe blacklist further includes:
    for each router, creating the safe blacklist for the router by adding the blacklist of illegitimate users; and
    deleting from the safe blacklist legitimate users that access the service through the router having a geographic location corresponding to legitimate users.

3. The method as recited in claim 1, wherein the blacklist includes one or more source internet protocol (IP) addresses, wherein legitimate users are identified by their source IP address.

4. The method as recited in claim 1, wherein sending the respective safe blacklist to each router further includes:
    sending a command to the router to drop packets having a source IP addresses in the safe blacklist for the router.

5. The method as recited in claim 1, wherein, when a first user accesses the service through the first router and a malicious user accesses the service through a second router, the malicious user spoofing a source IP address of the first user, determining the safe blacklist for each router further includes,
    omitting the source IP address of the first user from the safe blacklist of the first router; and
    adding the source IP address of the first user to the safe blacklist of the second router.

6. The method as recited in claim 1, wherein the method is executed by a processor in a security controller connected to the service network.

7. The method as recited in claim 1, wherein receiving the whitelist further includes:
    requesting the whitelist from a security engine module; or
    receiving updates to the whitelist pushed by the security engine module.

8. The method as recited in claim 1, wherein the security rules are configurable to detect attacks to the one or more servers based on the collected traffic data.

9. The method as recited in claim 1, wherein the safe blacklist includes a plurality of source IP address.

10. The method as recited in claim 1, wherein the geographic location of the legitimate users identify one or more of a metropolitan area, or a region, or a country, or a continent.

11. A security controller comprising:
    a memory for storing a security program;
    a network interface; and
    a hardware processor for executing the security program, wherein the hardware processor collects traffic data from routers of a service network, the routers providing users access to a service delivered by one or more servers;
    wherein the hardware processor applies the traffic data to a plurality of security rules to identify a blacklist of illegitimate users to be blocked from the service, the hardware processor receiving from the one or more servers a whitelist, the whitelist including information regarding legitimate users and a geographical location of the legitimate users;
    wherein the hardware processor determines a safe blacklist for each router based on the blacklist and the whitelist, the safe blacklist for a first router having a first router geographic location does not include any of the legitimate users accessing said first router from a first geographic location that corresponds to the first router geographic location, and the hardware processor sends the respective safe blacklist and not the whitelist to each router,
    wherein a legitimate not blocked from accessing the one or more servers via the first router by the safe blacklist,
    wherein an illegitimate user spoofing the legitimate user is blocked by the safe blacklist at other ones of the routers not having the first router geographic location when the illegitimate user tries to access the one or more servers from a geographic location that is not the first geographic location of the legitimate user being spoofed.

12. The security controller as recited in claim 11, wherein for each router,
    the processor creates the safe blacklist for the router by adding the blacklist of illegitimate users; and
    the processor deletes from the safe blacklist legitimate users that access the service through the router having a geographic location corresponding to legitimate users.

13. The security controller as recited in claim 11, wherein the blacklist includes one or more source internet protocol (IP) addresses, wherein legitimate users are identified by their source IP address.

14. The security controller as recited in claim 11, wherein the processor sends a command to the router to drop packets having a source IP addresses in the safe blacklist for the router.

15. The security controller as recited in claim 11, wherein, when a first user accesses the service through the first router and a malicious user accesses the service through a second router, the malicious user spoofing a source IP address of the first user, the processor determines the safe blacklist for each router by, omitting the source IP address of the first user from the safe blacklist of the first router; and adding the source IP address of the first user to the safe blacklist of the second router.

16. The security controller as recited in claim 11, wherein the service is a game streaming service.

17. A non-transitory computer-readable storage medium storing a computer program for a security controller, the computer-readable storage medium comprising:

program instructions for collecting traffic data from routers of a service network, the routers providing users access to a service delivered by one or more servers;

program instructions for applying the traffic data to a plurality of security rules to identify a blacklist of illegitimate users to be blocked from the service;

program instructions for receiving from the one or more servers a whitelist, the whitelist including information regarding legitimate users and a geographical location of the legitimate users;

program instructions for determining a safe blacklist for each router based on the blacklist and the whitelist, such that a first router of said routers having a router geographic location that is part of a first geographic location of a legitimate user is associated the safe blacklist that does not include the legitimate user, and remaining ones of said routers not having the router geographic location is associated with the safe blacklist that does include the legitimate user; and program instructions for sending the respective safe blacklist and not the whitelist to each router, wherein the legitimate user is not blocked from accessing the one or more servers via the first router by safe blacklist, wherein an illegitimate user spoofing the legitimate user is blocked by the said remaining ones of said routers using said safe blacklist when the illegitimate user tries to access the one or more servers from a geographic location that is not the first geographic location of the legitimate user being spoofed.

18. The storage medium as recited in claim 17, wherein determining the safe blacklist further includes:

for each router, creating the safe blacklist for the router by adding the blacklist of illegitimate users; and deleting from the safe blacklist legitimate users that access the service through the router having a geographic location corresponding to legitimate users.

19. The storage medium as recited in claim 17, wherein the blacklist includes one or more source internet protocol (IP) addresses, wherein legitimate users are identified by their source IP address, wherein sending the respective safe blacklist to each router further includes:

sending a command to the router to drop packets having a source IP addresses in the safe blacklist for the router.

20. The storage medium as recited in claim 17, wherein, when a first user accesses the service through the first router and a malicious user accesses the service through a second router, the malicious user spoofing a source IP address of the first user, determining the safe blacklist for each router further includes, program instructions for omitting the source IP address of the first user from the safe blacklist of the first router; and program instructions for adding the source IP address of the first user to the safe blacklist of the second router.

* * * * *